United States Patent
Böl

(10) Patent No.: US 8,302,649 B2
(45) Date of Patent: Nov. 6, 2012

(54) INFRARED WELDING DEVICE

(75) Inventor: Detlev Böl, Kaltenkirchen (DE)

(73) Assignee: Frimo Group GmbH, Lotte (DE)

( * ) Notice: Subject to any disclaimer, the term of this patent is extended or adjusted under 35 U.S.C. 154(b) by 301 days.

(21) Appl. No.: 12/655,202

(22) Filed: Dec. 23, 2009

(65) Prior Publication Data

US 2010/0181026 A1    Jul. 22, 2010

(30) Foreign Application Priority Data

Dec. 29, 2008   (DE) .................. 10 2008 063 177

(51) Int. Cl.
*B29C 65/14*   (2006.01)
(52) U.S. Cl. .................................... 156/379.8
(58) Field of Classification Search ............ 156/379.6, 156/379.8
See application file for complete search history.

(56) References Cited

U.S. PATENT DOCUMENTS

| | | | |
|---|---|---|---|
| 4,960,478 A | | 10/1990 | Newkirk et al. |
| 6,425,431 B1 * | | 7/2002 | Naito et al. ............... 156/539 |
| 2003/0221783 A1 * | | 12/2003 | Evans ............... 156/359 |

FOREIGN PATENT DOCUMENTS

| | | |
|---|---|---|
| DE | 20 2006 003323 | 8/2006 |
| EP | 0 327 265 | 8/1989 |
| GB | 2 345 459 | 7/2000 |

OTHER PUBLICATIONS

"Infrared Welder," http://web.archive.org/web/20060212080910/, available on Jan. 1, 2006.
"Hot Plate Welders," http://www.forwardtech.com/PlasticAssembly/HotPlate, available on Mar. 8, 2006.
European Search Report dated May 28, 2010, issued in corresponding European Patent Application No. 09180109.2.

* cited by examiner

*Primary Examiner* — Daniel McNally
(74) *Attorney, Agent, or Firm* — Kenyon & Kenyon LLP

(57) ABSTRACT

An infrared welding device comprising a machine base (1) having at least two workpiece supports (2) for two workpieces, the distance of which is variable, as well as at least one infrared radiator (3) fixed at a movable tool holder (4) of the machine base (1) and introducible into the gap of the workpieces formed by the distance of the workpiece supports (2). The distance of the workpiece supports (2) from each other and the relative assignment of the tool holder (4) are adjustable by a program control, wherein the workpiece supports (2) and the tool holder (4) may be assembled to form a welding module (7) transportable as closed unit (7) and may be connected with the machine base (1) by means of quick-action couplings (6).

11 Claims, 3 Drawing Sheets

INFRARED WELDING DEVICE

TECHNICAL FIELD

The invention concerns an infrared welding device comprising a machine base having at least two workpiece supports for two workpieces, the distance of which is variable, as well as at least an infrared irradiator fixed at a movable workpiece holder of the machine base and introducible into and removable from the gap of the workpieces formed by the distance of the workpiece supports. The infrared welding device is used in the mutual welding of large-format thermoplastic plastic parts that are employed in the manufacture of interior lining parts of motorverhicles.

STATE OF THE ART

An infrared welding device of the above-mentioned type is known form DE 20 2006 003 323 U1. Here, the plastic parts produced in a separate production step by injection molding, blow molding, die cutting, thermoforming or the like are placed in the workpiece fixtures and positioned with respect to the infrared radiator so that the surface portions to be welded soften up to the point of reaching a molten state. Thereafter the at least one infrared radiator is removed from the gap between the surface portions and the surface portions are fused together and joined by moving them toward each other and subsequently pressing them together. The joint is durable after subsequent cooling so that the ready-joined plastic parts may be removed and put to their use.

Achieving a good work result requires exact operation of the infrared radiator, which is associated with significant expenditure of time regarding its control. Also, the conversion work for welding workpieces of different configuration is very laborious because the workpiece holders and the tool holder are screwed to the machine base and are specially adapted thereto. It is therefore necessary to invest significant time for each conversion to a different workpiece.

It is an object of the invention to provide an infrared welding device which, in the event of a change of workpiece, requires significantly less time both for the conversion and for controlling the movements and the operation of the infrared radiator.

According to the invention, this object is achieved by the characterizing features of claim 1. The dependent claims define advantageous embodiments.

In order to achieve this object, the infrared welding device of the invention comprises a machine base having at least two workpiece supports for two workpieces the distance of which is variable as well as at least an infrared radiator fixed at a movable tool holder of the machine base and introducible into the gap of the workpieces formed by the distance of the workpiece supports. The mutual distance of the workpiece supports and, thus, of the workpieces and the relative assignment of the tool holder are variable by means of a program control, and the workpiece supports and the tool holder can be moved together (assembled) to form a welding module transportable as a single unit and can be connected to the machine base by quick-action couplings. A potential tool change may thus be performed in a few minutes.

The workpiece supports and/or the tool holder may be provided with spacers and may be unshiftably supported on each other within the welding module 7 by the spacers 5. The self-contained welding module may thus be moved as self-contained and self-stable unit without running the risk of inadvertently damaging the infrared radiator(s). Rather, the infrared radiators are specially protected by the workpiece supports during storage and transport without requiring any additional effort. Thus, arbitrary and mechanically highly sensitive infrared radiators can be used, for instance quartz radiators and/or heating foils.

The individual parts within the assembled transportable welding module are positioned so as to be directly engageable with the respective quick-action couplings of the machine base without elaborate manipulation. This accelerates a change of tool.

In addition, during normal use, the workpieces to be welded are located between the workpiece supports and the tool holder or the infrared radiator fixed thereon, which excludes that the spacers get into abutting contact during normal use of the welding module and might prevent a correct welding process from being obtained. The pressing operation necessary for a good weld of the parts to be joined may thus be effected without the spacers getting into mutual abutting contact.

In the simplest case, the program control may be effected by means of a sequence control, which may also be configured as pneumatic control. It may comprise an additional module for switching on and off the at least one radiator. If several infrared radiators for generating different welding zones are provided, it may be appropriate to use infrared radiators with different power-ratings. However, in order to obtain a good welding result when concurrently joining the workpieces in all welding zones, it is necessary to achieve the ideal welding temperatures in all welding zones at once. The infrared radiators are activated accordingly. They may be covered by blinds in areas that are not heated in order to generate welding zones separated from each other and having only one infrared radiator.

The infrared radiators, in conjunction with mirrors, may further be directed on to hard-to-reach locations of the workpieces, too. Moreover, infrared radiators may be used that heat the opposing welding zones by means of only a single heat source.

Depending on the type of the infrared radiator it may be important to arrange it during its activation at a predetermined distance from the region to be heated. The distances of the workpiece holders are adjusted accordingly by means of the control.

The change of tool may further be accelerated if the program control comprises an additional locking module for the quick-action couplings. This leads to the additional advantage that operation can be blocked in a particularly simple manner if not all quick-action couplings are properly actuated. Thus, accidental damage of the infrared welding device is prevented.

It has proven to be particularly advantageous if the welding module is insertable into the machine base from behind and is connectable to the machine base 1 only by means of the laterally arranged quick-action couplings. The . . . for feeding workpieces into the infrared welding device from the front is, thus, not necessary for a tool change, making it possible to provide roll conveyers or the like at the front side of the infrared welding device in order to facilitate feeding and discharging the workpieces. Accordingly, the welding module can be appropriately fed with workpieces to be welded only from the direction of the front side of the machine base, wherein the welded workpieces may be removed only in the direction of the front side.

Due to ergonomic reasons it has proven advantageous if at least one workpiece support is pivotably connectable with the machine base. The mutual temporary connection of the workpieces with the workpiece holders may be effected by means of suction cups and the positioning of the workpieces may be substantially facilitated if overhead feeding is avoided. Therefore, at least the upper workpiece holder should be pivotable at least into a vertical position, better still into an at least approximately table-like position.

In order not to obstruct the insertion and removal of the workpieces, it may be advantageous if the tool holder is displaceable or pivotable in the machine base in relation to the workpiece supports.

In order to further accelerate the tool change, a storage for at least two welding modules may be associated with the machine base from the backside, wherein means are provided to allow the welding modules received in the storage to be introduced alternatively into the machine base and to be engaged with the quick-action couplings. The storage may be formed by a ring storage or a high bay racking (a high rack storage). A tool change may also be effected in a fully automatic manner. To that end, runners (skids) and/or roller conveyors may be provided at least in the machine base for easier introduction and removal of the welding module.

Further, if at least two welding modules carrying correspondingly applied identification marks are provided, the possibility exists to configure the identification marks for inputting into the program control, wherein workpiece support, tool holder and the at least one infrared radiator are operable by the program control in function of the respective identification mark. After a tool change, a renewed adjustment of the tool movements and the activation periods and times of the at least one infrared radiator are, thus, superfluous and real production may immediately begin again by utilizing data already previously stored for that purpose.

To that end it has proved advantageous if the program control is comprised in a computer, if the identification marks are identifiable by means of sensors of the machine base, of the workpiece support and/or of the tool holder, if the sensors are connected to the computer for signal transmission and if the workpiece supports, the tool holder and the at least one infrared radiator are moved and/or are operable by the computer in function of the respective identification marks.

BRIEF DESCRIPTION OF THE FIGURES

In the following, the invention is further illustrated by means of the figures, in which.

DETAILED DESCRIPTION OF THE EMBODIMENTS

Figure 1:
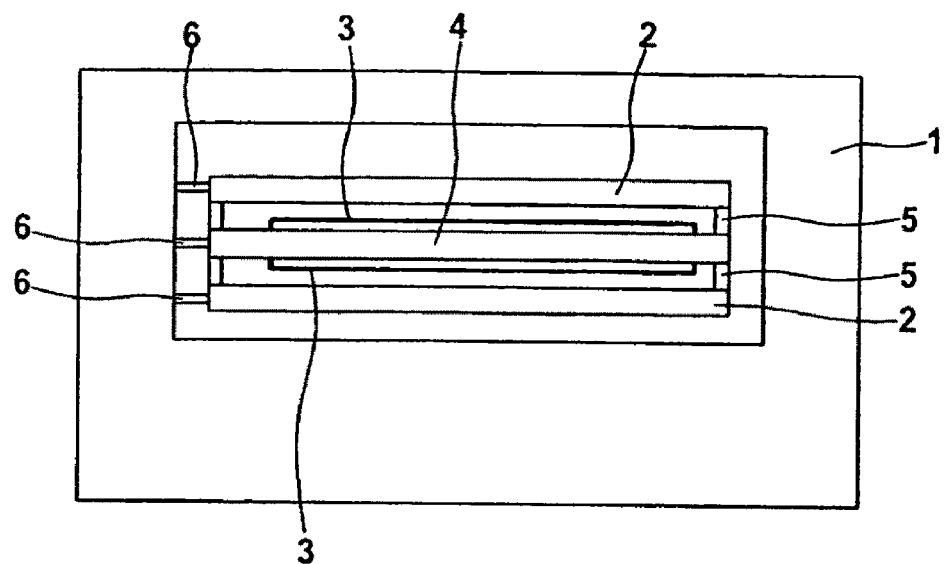
FIG. 1 is a front view of an exemplary embodiment of the infrared welding device.

The same reference numerals in the various drawings indicate the same components.

FIG. 1 shows a front view of an exemplary embodiment of the infrared welding device. It comprises a machine base 1 having a welding module 7 inserted therein and made of two workpiece supports 2 for two workpieces 10.1, 10.2 the distance of which is variable, as well as two infrared radiators 3 fixed at a movable tool holder 4 of the machine base 1 and introducible into the gap of the workpieces 10.1, 10.2 formed by the distance of the workpiece supports 2. The infrared radiators 3 consist of high power quartz radiators effective in the short wave infrared region and causing a rapid heating of the workpieces 10.1, 10.2 to be welded. Regions of the infrared radiators 3 unnecessary for this purpose are covered from the workpieces 10.1, 10.2 by baffles (not shown). The workpiece support 2 and tool holder 4 are connected independently from each other to the machine base 1 by quick-action couplings 6 and are displacable relative to each other in a vertical and horizontal direction. In order to introduce the workpieces 10.1, 10.2 to be welded, the workpiece supports 2 and the tool holder 4 are vertically and/or horizontally distanced from each other, and possibly pivoted, to such a degree that the workpieces 10.1, 10.2 can be ergonomically introduced and removed. This is indicated in the side view of FIG. 3. In order to perform a welding operation of the workpieces 10.1, 10.2, they are arranged at an exactly predetermined distance so that the infrared radiators may cause sufficient thermal softening of the material of the workpieces 10.1, 10.2 to be welded in the subzones to be welded. As soon as the correct softening state is reached, which usually is a melted state of the surface of the workpieces 10.1, 10.2 in the region of the zones to be welded, the infrared radiators 3 are removed from the gap of the workpieces 10.1, 10.2 by means of the tool carrier 4, and the workpieces 10.1, 10.2 are pressed onto each other with an exactly predetermined force under mutual approximation of the workpiece supports 2 in the region of the zones to be welded. In the softened zones, the material of the workpieces 10.1, 10.2 flows into each other, resulting in a mutual weld-joint of the workpieces 10.1, 10.2. After subsequent cooling of the material, this joint is mechanically solid and stable. Both workpieces 10.1, 10.2 are, thus, fixedly connected to form a unit.

For practical application it is of essential significance that the infrared radiators are employed in a very targeted manner and only the zones to be welded are thermally softened. This is achieved by a targeted selection, positioning and possibly covering of the workpieces 10.1, 10.2 and/or the infrared radiators by means of masks in regions of the workpieces 10.1, 10.2 that are not to be heated and welded. Therefore, there is no need to worry about damaging the workpieces 10.1, 10.2 in those areas through welding. Accordingly, they may be designed arbitrarily and even be provided with heat-sensitive additional components there.

Figure 2:
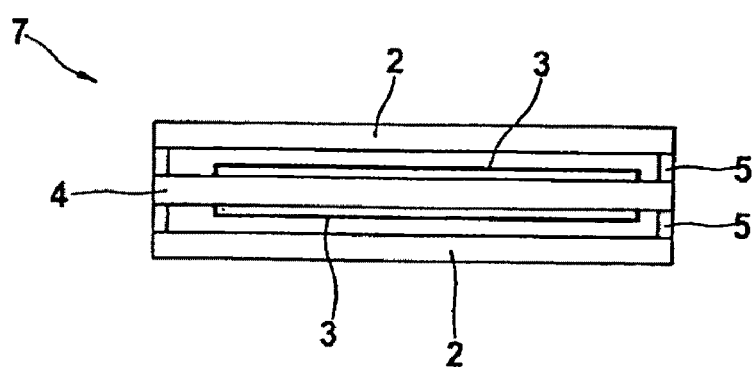
FIG. 2 is a front view of an infrared welding module assembled to form a transport unit.

In order to achieve a good welding of the workpieces 10.1, 10.2, the individual process steps of at least heating the welding zones of the workpieces 10.1, 10.2 and pressing them together have to be exactly coordinated and performed rapidly. The distance of the workpiece supports 2 from each other and the relative assignment of the tool holder 4 may be varied to that end by means of a program control, and the workpiece supports 2 and the tool holder 4 may be moved together (assembled) to from a welding module 7 transportable as closed unit 7, as shown in FIG. 2. The workpiece supports 2 and the tool holder 4 are connectable to the machine base 1 by means of quick-action couplings 6. The quick-action couplings 6 comprise, apart from the mechanical connections of the workpiece supports 2 and the tool holder 4, the electrical connections of the infrared radiators 3.

The workpiece support 2 and the tool holder 4 are provided with spacers 5 and, within the welding module 7, are unshiftably supported onto each other by means of the spacers 5. The welding modules 7 can thus be handled, transported and stored as closed units.

The machine base 1 comprises a program control having an additional module for the correct switching on and off of the two infrared radiators 3. This allows to heat also differently activatable welding zones so that they simultaneously reach the optimum welding temperature as precondition for achieving optimal mutual welding in all sub-areas after removing the infrared radiators 3 and pressing the welding zones together, i.e. optimal melting into each other of the two materials of the workpieces 10.1, 10.2 to be welded in the zones to be welded.

The program control comprises an additional locking module for the quick-action couplings 6. Thus, before all quick-action couplings 6 are properly locked, operation of and damage to the infrared welding device is excluded.

The welding modules 7 can be introduced into the machine base 1 only from behind and can be connected to the machine base 1 only by the quick-action couplings 6 installed on the side. This facilitates a quick tool change.

Figure 3:
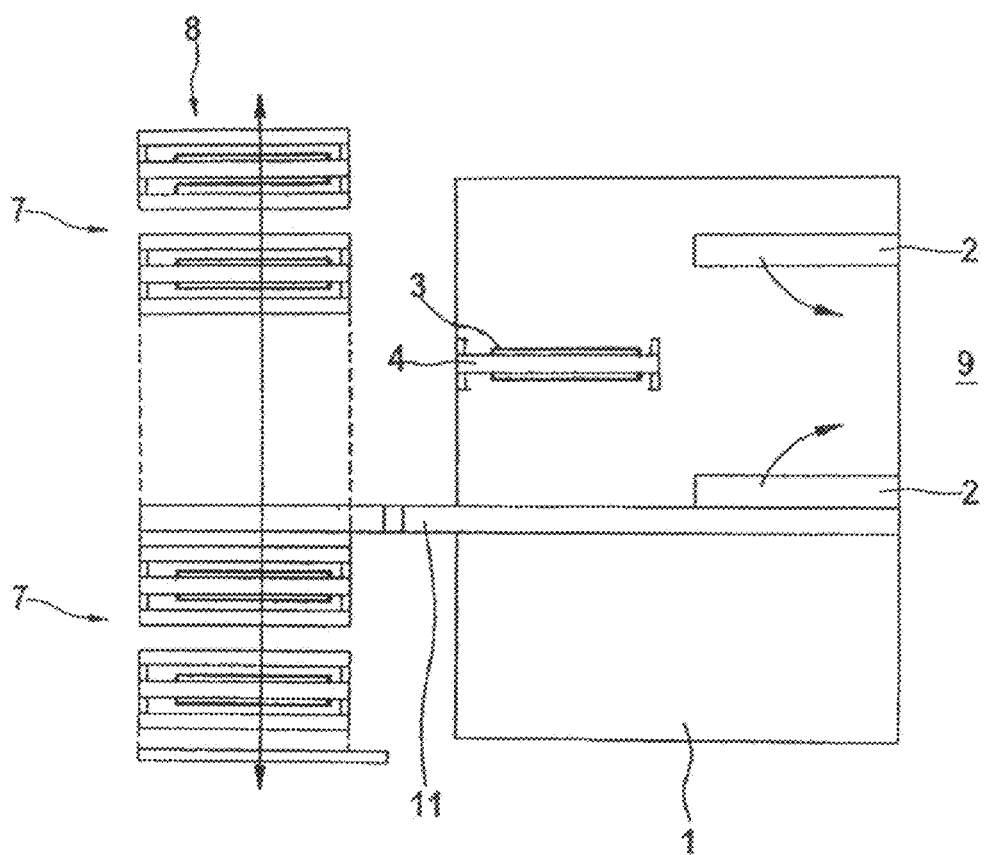
FIG. 3 is a side view of the infrared welding device having a storage for several infrared welding modules arranged at the rear side.

In the embodiment of FIG. 1, both workpiece supports 2 introduced into the machine base 1 are pivotably connected with the machine base 1, as is indicated by the arrows in FIG. 3. Feeding the workpieces 10.1, 10.2 thereinto is, thus, much facilitated. In particular, it does not require any introduction and removal of workpieces 10.1, 10.2 into/out of an ergonomically unfavourable overhead position.

The tool holder 4 is installed in the machine base 1 so as to be displaceable relative to the workpiece supports 2 in order not to obstruct the introduction or removal of workpieces.

A storage 8 for at least two welding modules 7, in the present case for five welding modules 7 is associated with the machine base 1 from its rear side, wherein means are provided to allow the welding modules 7 received in the storage 8 to be alternatively introduced into the machine base 1 and engaged with the quick-action couplings 6. The storage 8 is configured in the manner of a high rack storage and comprises several storage compartments arranged above each other, at which several welding modules 7 may be placed independently from each other, which modules are immediately available for individual access as needed and may be transferred into the machine base 1. In order to facilitate this skids for the welding modules 7 are provided in the machine base 1 and the storage 8. The high rack storage is vertically displacable so as to be able to position every storage location immediately behind the rear-side insertion opening of the machine base 1 as needed. Alternatively, it is possible to provide a gap between the high rack storage and the machine base 1, in which gap a tool manipulator (not shown) is disposed. Such manipulators are known in high rack storage technology.

The welding module 7 may be fed with the workpieces 10.1, 10.2 to be welded only from the direction of the front side 9 of the machine base 9. In the same direction, the welded workpieces 10 may be removed only in the direction of the front side 9.

The welding modules 7 bear correspondingly applied identification marks, wherein the identification marks may be manually input into the program control and wherein the workpiece supports 2, the tool holder 4 and both infrared radiators 3 may be operated by the program control in function of the respective identification mark. This saves separate adjustment work after a tool change, and it is in particular unnecessary to entrust skilled personal with feeding, operating or a tool change.

In the present case, the program control is comprised in a computer (not shown) wherein the identification marks may be identified by sensors of the machine base 1, the workpiece supports 2 and/or the tool holder 4, wherein the sensors are connected to the computer for signal transmission and wherein the workpiece supports 2, the tool holder 4 and both infrared radiators 3 may be operated by the computer in function of the respective identification mark. An operating error is thus completely excluded. An identification mark which can be identified in a particularly secure manner consists of a barcode, but the invention is, of course, not restricted thereto.

Figure 4:
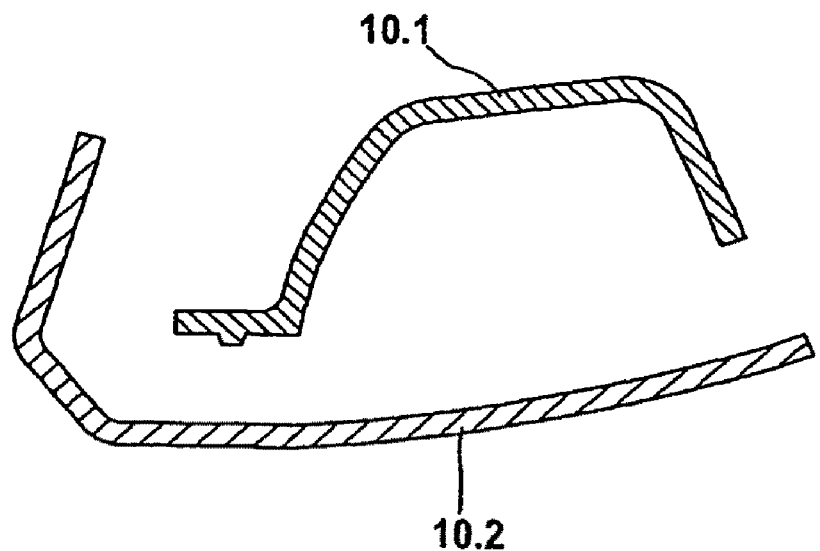
FIG. 4 is a cross sectional view of two exemplary workpieces to be welded.

FIG. 4 shows a cross-sectional view of two exemplary workpieces to be welded. They are large-format injection molded components intended for use as supports of a dashboard in a motor vehicle and which are to be welded only in a sub-region and subsequently enclose a large-dimensioned cavity.

In the sub-region to be welded, one of the workpieces 10.1 is provided with a latch integrally formed thereto and protruding vertically with respect to the welding plane, in order to provide a sufficiently large volume of weldable mass in the welding zone, which can be thermally softened without endangering stability and shape retention of the workpiece 10.1 as such. At least the latch of one workpiece 10.1 and the opposite welding zone of the other workpiece 10.2 are heated parallel to each other by infrared rays and brought to the welding temperature by temporarily introducing the tool holder 4 with the infrared radiators 3 fixed thereto and effective in both directions into the gap of the workpieces 10.1, 10.2 to be welded and activating it so that both workpieces simultaneously reach the optimum welding temperature. Subsequently, the tool carrier 4 is quickly moved out of the gap in a transverse direction, and the two workpieces 10.1, 10.2 are pressed together in the region of the zones to be welded, and the welding zone is consolidated by cooling.

Figure 5:
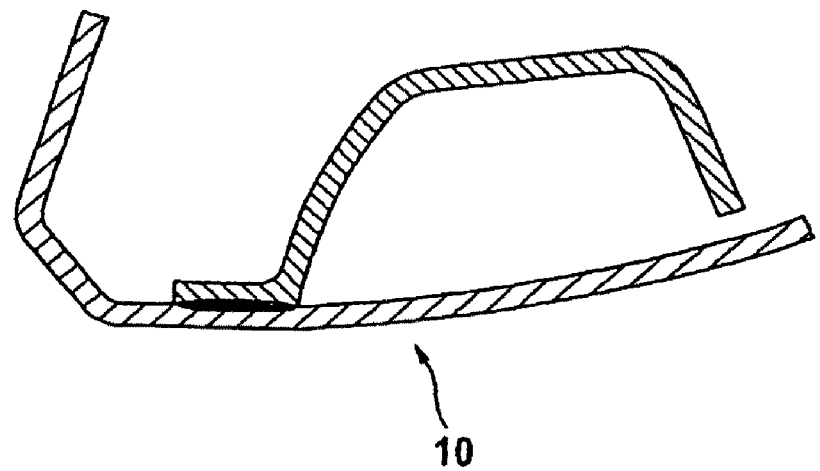
FIG. 5 shows the workpieces of FIG. 4 after mutual welding.

FIG. 5 shows the workpieces 10.1, 10.2 of FIG. 4 after the mutual welding. They are united to a single formed component 10 which is held together only in the region of a welding zone and which may be put to further use. Of course, several welding zones connecting the workpieces may be provided.

The invention claimed is:

1. An infrared welding device comprising:
   a machine base having at least two workpiece supports for two workpieces, a distance between the workpiece supports being variable,
   at least one infrared radiator fixed at a movable tool holder of the machine base and introducible into a gap formed by the distance between the workpiece supports, and
   a program control,
   wherein the distance between the workpiece supports and a relative assignment of the tool holder are adjustable by the program control, and wherein the workpiece supports and the tool holder are assemblable to form a welding module transportable as closed unit and are connectable to the machine base by quick-action couplings,
   wherein a storage for at least two welding modules is associated with the machine base from a rear side, and wherein the welding modules received in the storage are alternatively introducible into the machine base and engageable with the quick-action couplings.

2. The infrared welding device according to claim 1, wherein at least two welding modules bearing correspondingly applied identification marks are provided, the identification marks are inputable into the program control and the workpiece supports, the tool holder and the at least one infrared radiator are operable by the program control as a function of the respective identification mark.

3. The infrared welding device according to claim 2, wherein the program control is comprised in a computer, the identification marks are identifiable by sensors of at least one of the machine base, the workpiece supports and the tool holder, the sensors are connected with the computer for signal transmission and the workpiece supports, the tool holder and the at least one infrared radiator are operable by the computer as a function of the respective identification mark.

4. The infrared welding device according to claim 1, wherein at least one of the workpiece supports and the tool holder are provided with spacers and are unshiftably supported on each other within the welding module by the spacers.

5. The infrared welding device of claim 4, wherein the program control comprises an additional module for switching on and off the at least one infrared radiator.

6. The infrared welding device according to claim 1, wherein the program control comprises an additional locking module for the quick-action couplings.

7. The infrared welding device according to claim 1, wherein the welding module is introducible into the machine base from the rear side and is connectable to the machine base by quick-action couplings installed on an inside.

8. The infrared welding device according to claim 1, wherein at least one workpiece support is pivotably connectable with the machine base.

9. The infrared welding device according to claim 1, wherein the tool holder is displaceable or pivotable in the machine base relative to the at least two workpiece supports.

10. The infrared welding device according to claim 1, wherein the welding module may be fed with the workpieces to be welded from a direction of a front side of the machine base and the welded workpieces are removable in the direction of the front side.

11. The infrared welding device according to claim 1, wherein at least one of skids and roller conveyors are provided at least in the machine base for facilitating introduction and removal of the welding module.

* * * * *